(No Model.) 4 Sheets—Sheet 1.
W. BUTTERFIELD.
REEL RAKE FOR REAPERS.
No. 533,944. Patented Feb. 12, 1895.
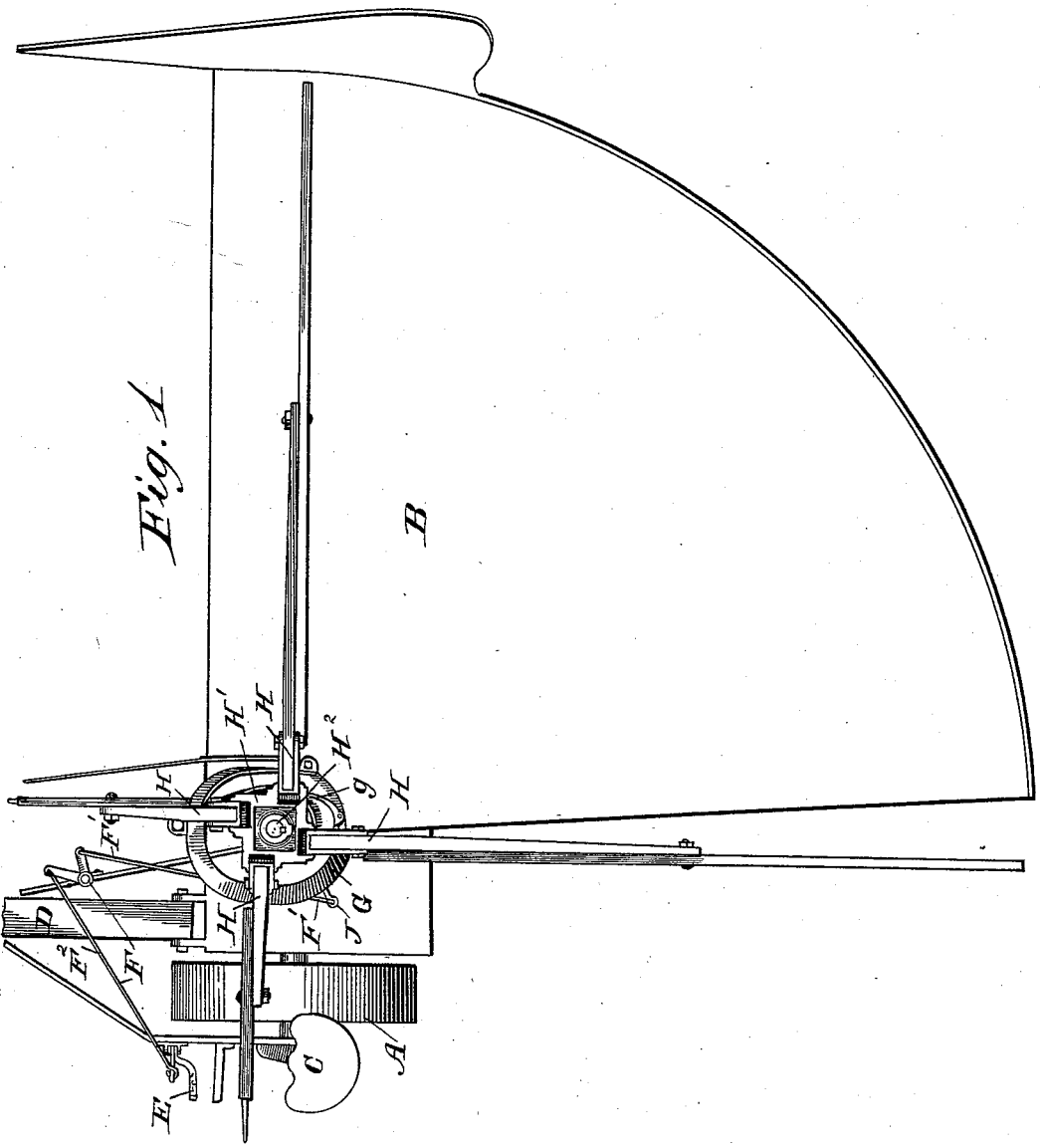
Witnesses.
Arthur Johnson
George H Ellis
Inventor.
William Butterfield

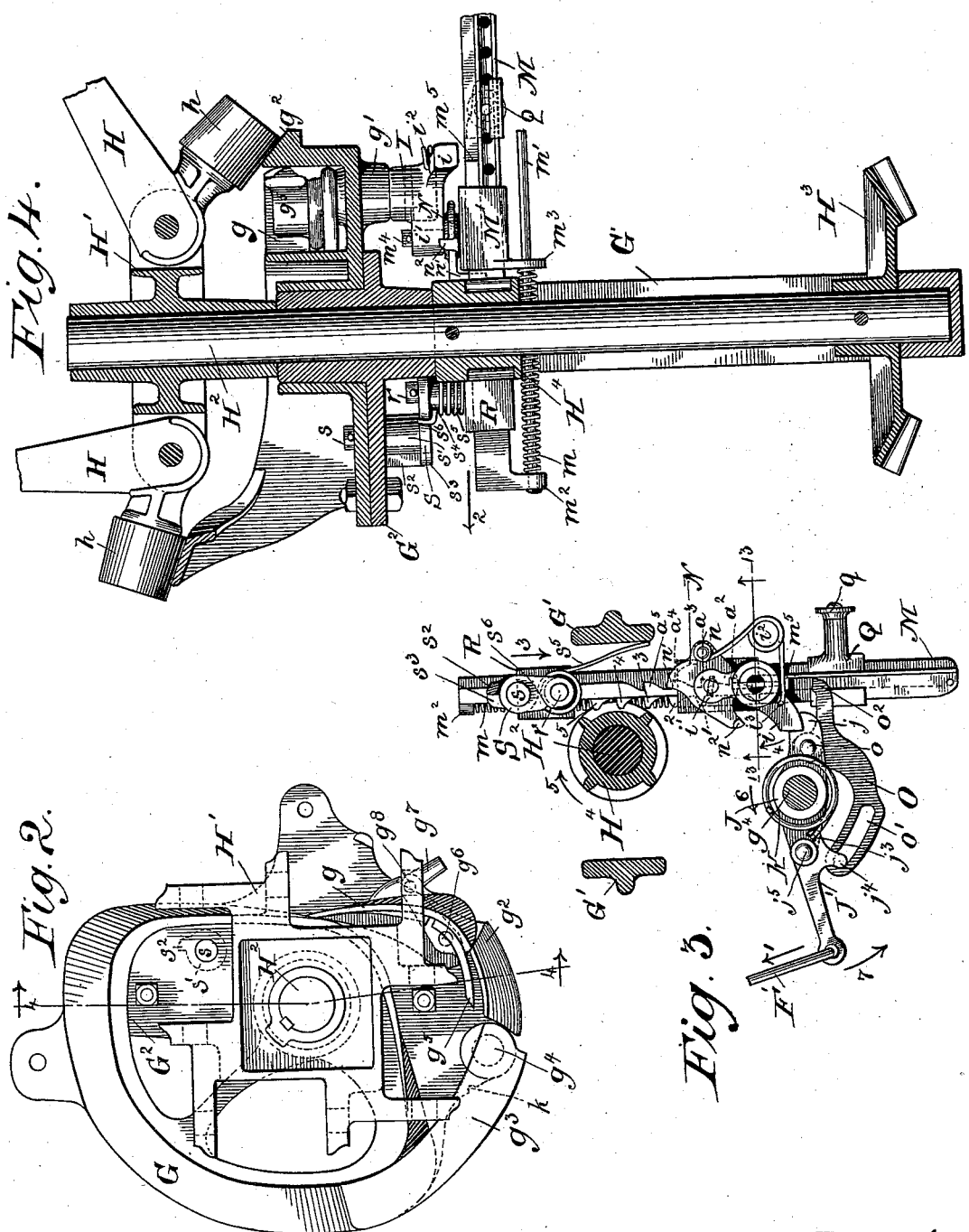

(No Model.) 4 Sheets—Sheet 3.
W. BUTTERFIELD.
REEL RAKE FOR REAPERS.
No. 533,944. Patented Feb. 12, 1895.
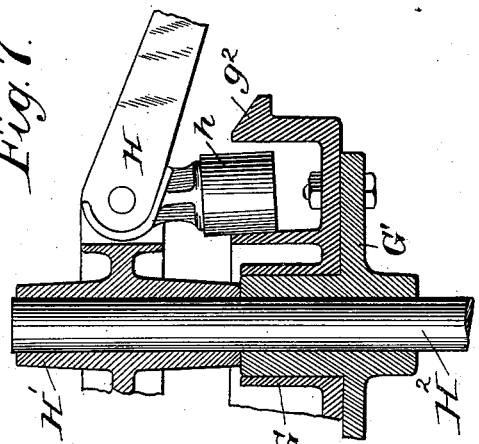
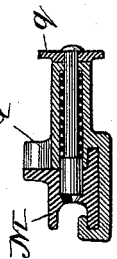
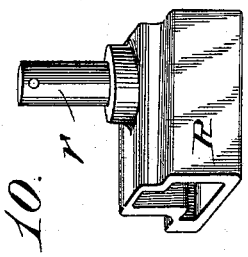
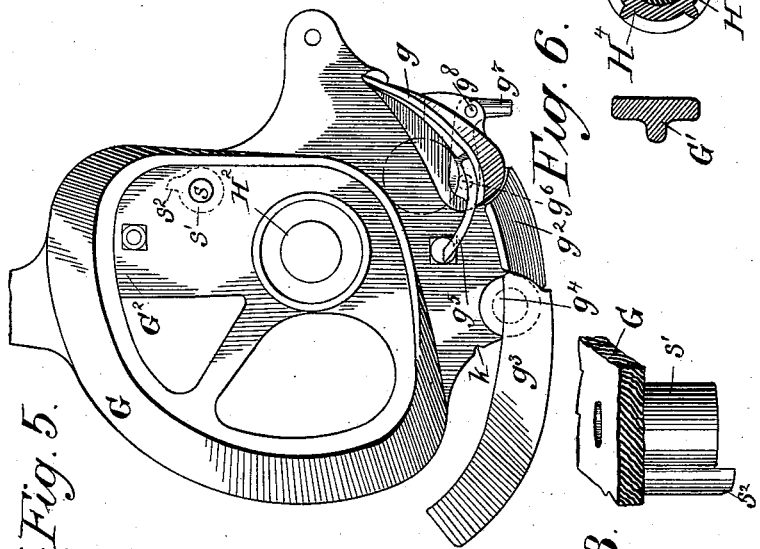
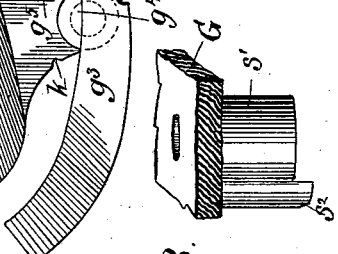
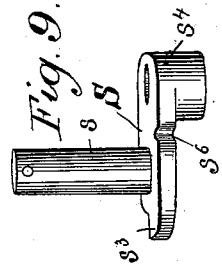
Witnesses.
Arthur Johnson
George H. Ellis
Inventor.
William Butterfield (No Model.) 4 Sheets—Sheet 4.
W. BUTTERFIELD.
REEL RAKE FOR REAPERS.
No. 533,944. Patented Feb. 12, 1895.
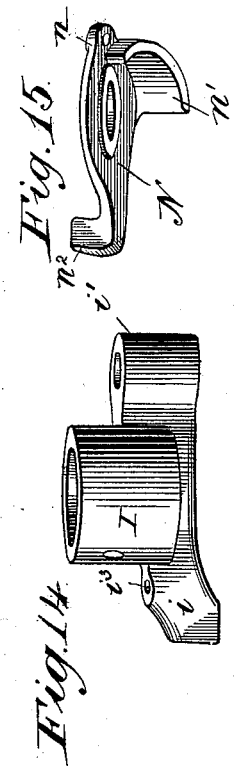
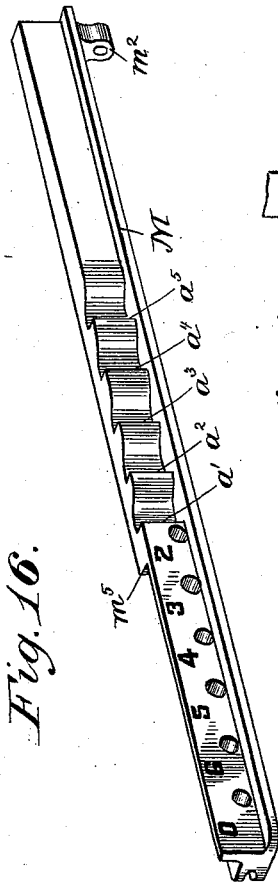
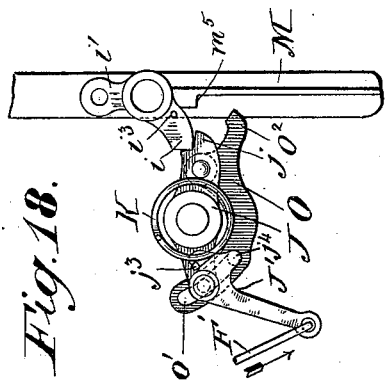
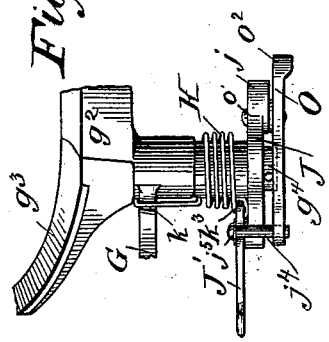
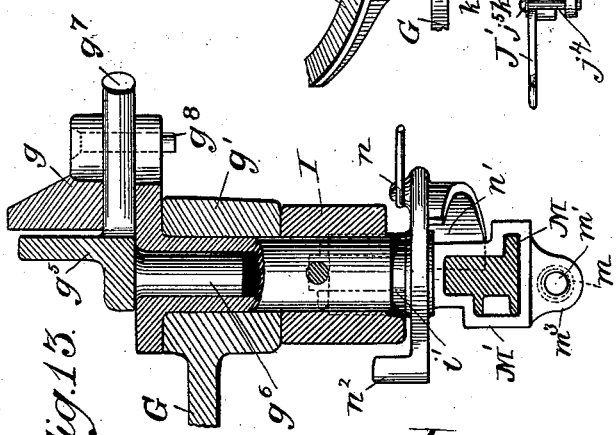
Witnesses
Arthur Johnson
George H. Ellis
Inventor
William Butterfield

United States Patent Office.

WILLIAM BUTTERFIELD, OF CHICAGO, ILLINOIS.

REEL-RAKE FOR REAPERS.

SPECIFICATION forming part of Letters Patent No. 533,944, dated February 12, 1895.

Application filed July 30, 1894. Serial No. 518,982. (No model.)

*To all whom it may concern:*

Be it known that I, WILLIAM BUTTERFIELD, of Chicago, in the county of Cook and State of Illinois, have invented certain new and useful Improvements in Reel-Rakes for Reapers, of which the following is a full description, reference being had to the accompanying drawings, in which—

Figure 1 is a general plan view of a reaper; Fig. 2, a plan view of the rake-head and switches; Fig. 3, a plan view of the switching controlling mechanism. Fig. 4 is a vertical section on the line 4—4 of Fig. 2. Figs. 2, 3, and 4 represent the parts in their positions when the rake-controlling switch is closed. Fig. 5 is a plan view of the rake-controlling cam. Fig. 6 represents the same parts as shown in Fig. 3. In the said Figs. 5 and 6 the parts are shown in the positions they occupy when the rake-controlling switch is open. Fig. 7 is a vertical section of the rake-controlling hub, the rake arm and a portion of the rake cam. Figs. 8, 9, 10 and 11 are details of construction of the rake controlling mechanism. Fig. 12 shows the convertible switch whereby all of the rakes may be trained into the raking path, thus in effect swathing the grain cut. Fig. 13 is a section on the line 13—13 of Fig. 3. Fig. 14 represents the switch latching arm, and Figs. 15, 16, 17 and 18 are details of construction.

The object of my invention is to provide a rake-controlling device for reapers that can be operated at will, that can be set to swath the grain to make every second, every third, every fourth, every fifth or every sixth arm serve as rakes and sweep the grain from the platform.

In the figures, A represents the master wheel and B the platform. Upon the stubble end of the platform is mounted the combined reel and rake, in general construction not differing from those long in use. Upon the axle at the stubble side of the main wheel is the driver's seat C.

D is the draft tongue.

E is a pedal within reach of the driver's feet, having connections F that reach to the switch-controlling devices.

G is the rake guiding cam. This cam G is supported on a standard, (one part of which, G', is shown in Fig. 4) and bolted to lugs on the same, one of which is shown at $G^2$. The cam surface is continuous and of the general form shown in Figs. 2, 4, and 5.

$g$ is the switch pivoted to the cam G, as shown in Fig. 2, the switch end passing through and having a bearing in the boss $g'$. $g^2$ is a section of an outer wall of the cam upon which at times, and under and behind which at times the rollers $h$ of the rake arms H roll. The axis of the switch $g$ is adjacent to the portion $g^2$ of the cam and when it is in the position shown in Fig. 2, with its point thrown against the continuous wall of the cam, the rollers of the rakes will be so guided as to rise from the platform and ride along the top of the switch as the track across the portion $g^2$ of the cam and across the pivoted bridge $g^3$ pivoted at $g^4$ to the cam frame, as shown in Figs. 2, 5 and 17. If the switch $g$ is given the position shown in Fig. 5 the roller shown in that figure will travel close beside the part of the cam G having the lesser diameter. As the bridge $g^3$ is free to move, the roller passing behind the switch can pass upward along the track of the cam $g$, forcing said bridge out of its way. It is thus seen how the switch can be made to cause the rollers of the rake arms to pass in either of the desired paths. The said arms are pivoted to the head H', and the latter keyed to the shaft, $H^2$. At the foot of this shaft is the bevel gear $H^3$ by which the shaft is given rotation. The switch once opened to permit one of the rake-controlling rollers to pass between it and the cam, is closed by the same roller when passing from behind it. To accomplish this the switch is given an arm $g^5$. Extending beyond the pivotal point of the switch, is the arm $g^5$, so located that the roller (see Fig. 5,) once having entered the space between the point of the switch and the main cam, passes onward, thus closing the switch. The switch is thrown open by a spring and thereby held until the roller, passing against the arm $g^5$, forces it to close as stated, where it is latch held. The swathing feature of my rake can now be understood. The switch of itself does not differ from those in common use, except that the arm $g^5$ of the switch is pivoted to the arm $g$, the pivot $g^6$ being preferably coincident with the axis of movement of the switch. The two positions given the latch may be determined by reference to Fig. 12 where it is in the position that it cannot close the switch because the rollers pass without moving it, and to Fig. 5, where it is shown to be in the path of the roller about to reach it. The switch is slotted, as shown in Fig. 13, and within the slots the arm $g^7$ rests. A pin $g^8$ passes through the lugs on the switch, and when it is desirable to close the switch during the passage of the roller, the pin is placed through the arm $g^7$ of the latch $g^5$, but if it is desired to throw $g^5$ out of such position that the passing of the rollers will influence the switch, the arm $g^7$ is moved to the position shown in Fig. 12, and the pin $g^8$ re-inserted, as there shown, whereby the arm $g^5$ is held in the desired position. This feature of my invention I consider important as, by a simple adjustment, the rake is made to swath the grain at will, and that without the removal of the switch and the substitution of a new one not having the adjustable arm $g^5$. The pivot of the switch extends downwardly through the boss $g'$ of the cam where it receives the part I, the latter pinned thereto, and having what may be considered an arm $i$ and an arm $i'$.

$i^2$ is a spring, one end hooked into the eye $i^3$ and the other end secured to what we may for the moment consider any convenient place, whereby its elasticity may be exerted to move the arm $i$, and through it and the axis piece of the switch the point of the latter to its position farthest distant from the inner cam wall. The arm $i$ not only serves to receive the end of the spring $i^2$, but when properly engaged by the end $j$ of the latch J, holds the switch in its closed position.

The arrangement of parts to operate the latch J will best be understood by describing its constructions and operations in detail.

For the moment let J and J' be considered as one piece and pivoted on the lower end of the axis $g^4$ of the bridge $g^3$, as shown in Fig. 17, and with a spring K coiled around the hub of the said lever J, its upper extremity resting in a notch $k$ in the cam G, see Fig. 5, and its lower end entering an eye $j^3$ in J', as shown in Fig. 3. Assume the switch to be in the position shown in Fig. 2 and there locked by $i$ and $j$, see Fig. 3, being in engagement. Now let the rod F' be moved in the direction indicated by the arrow No. 1 in Fig. 3. $j$ will be drawn away from $i$, the spring $i^2$ will assert itself and the arm $i$ and hence the switch be moved so that its point shall be in the position shown in Fig. 5, in which the roller of the next rake to come will be permitted to pass within the switch and the reel arm having said roller thus permitted to sweep horizontally and serve as a rake. Thus unlatched to permit the switch to be opened by the spring, the parts will be in the position shown in Fig. 6. The roller of a rake having once entered the switch when the latter is not so adjusted as to permit swathing soon reaches the arm $g^5$ and thus rocks the switch on its axis, carrying with it, of course, the arm $i$ from its position in Fig. 6 to the position shown in Fig. 3, when the switch will again be closed and there locked. The rod F' is preferably extended forward and by means of bell crank connection to the rod F² connected to the trip lever E. It is now plain that the switch may be tripped at will by the operator.

In order that the operation of the switch may become automatic I provide mechanism whereby for every rake that passes, an unlatching device shall move one step and make the said mechanism adjustable in such a manner that any desired number of steps may be taken; or perhaps a preferable statement would be, whereby any number of rakes desired may be made to pass before unlatching takes place. This I accomplish by the following means: Upon the shaft H² is secured a four-leafed pinion H⁴, its teeth, from preference, crowned, as shown in Fig. 4. It will be seen that there are four rake arms pivoted to the rake-head and hence that for every rake arm is a tooth. M is a rack that is thrown into position by the spring $m$ on the spring rod $m'$, the said spring resting against the down-turned end $m^2$ of the rack M, and against a lug $m^3$ through which the rod $m'$ passes, the said lug extending from the guiding piece M'. Not considering for a moment any other offices of the part M' it will be readily understood that the tension of the spring will force the rack M in the direction indicated by the arrow No. 2 in Fig. 4. Turning to Fig. 3 it will be seen that the rack is provided with teeth 1, 2, 3, &c. With the parts in the position shown in Fig. 3, if the shaft H² be rotated the teeth of the four-leafed pinion will be caused to engage a new tooth and move the rack M one step in the direction indicated by the arrow No. 3 in Fig. 3. Upon the side of the rack bar, opposite the teeth forming the segment are notches $a'$, $a^2$, $a^3$, &c. The guiding piece M' is similar in form to, and hence may be considered as represented by, the part R shown in Fig. 10, except that it is provided with the lug $m^3$. Its stem $m^4$ passes through the eye in the arm $i'$ of the part I, as will be seen by reference to Fig. 4, where and in Fig. 13 it is shown as held in place by a pin.

N is a pawl for holding the sliding rack in any position to which it may be carried by the teeth that actuate it. This pawl is pivoted on the stem of the guiding piece M' between its main body and the arm $i'$ having the eye through which its stem in turn passes. To this pawl at $n$ is connected the spring $i^2$ by which it is held in the position shown in Fig. 3. As the ratchets $a'$, $a^2$, $a^3$, &c., slope, as shown in the figure, they are permitted to force their way beyond the engaging part $n'$ of the pawl before the latter is forced by the spring in such a position as to catch and hold to each of said ratchet teeth. As the rack is forced, in the direction indicated, by the teeth of the four-leafed pinion engaging with its teeth, the pawl locks it from retrograde movement under the pressure of the spring end. It will now be seen that it is only necessary to so move the pawl that its engaging point $n'$ shall be released from the ratchet teeth in the rack bar, when the latter will be free to be moved by the spring $m'$. The object of setting the rack bar free by means of the pawl is simply that the said bar may return to its initial position so as to give what may be termed a new count to the passage of the rakes. Besides this and in fact just previous to this unlatching of the pawl another movement is necessary, namely, an unlatching that shall permit the switch to open. As stated, the stress of the spring $i^2$ is such as to throw its two ends farther apart. The tendency then is to press the engaging point of the pawl into the latches of the rack. Performing the office of throwing the switch as the spring does, it is first necessary to consider how it acts. The lever J, pivoted upon the axis $g^4$, serves as the lock to hold the arm $i$ in the position shown in Fig. 3. Let us suppose the rod F' to be drawn in the direction indicated by the arrow No. 1. The arm $i$ will be moved in the direction indicated by the arrow No. 4 in the drawings. Furthermore, as the active point of the pawl N rests in the rack it cannot move and the result of the effort of the spring to turn the pawl N on its pivot $i'$ will be to throw the arm $i$ in the direction indicated. Now as the switch is mounted on the same stem as the piece I, when the latter moves the switch must move, and the spring that moves one in effect moves the other. So far the switch has been free to fly open, and the springs has made it so do. Turning to Fig. 6 a shoulder $m^5$ is seen. This will be seen also in Figs. 3, 16 and 18.

O of Fig. 3 is a lever pivoted to the lever J at $o$, and connected to the lever J' by means of the slot O', and downwardly projecting pin $j^4$, the purpose of which will be hereinafter explained. This lever O for the present purpose may be considered to be as one piece with J and J'. In Fig. 3 the shoulder $m^5$ has very nearly reached the free end $o^2$ of the lever O. The four-leafed pinion moving in the direction indicated by the arrow No. 5 the next tooth will engage the tooth No. 5 of the rack, and the latter will be moved until the shoulder strikes the operative end $o^2$ of the lever O, when the lever and hence the arm $j$ will be carried from engagement with the arm $i$ and the latter will be free to move in the direction before indicated and set the latch free. It is thus seen that the movement of the rack bar sets the switch free. It is clear that if the rack bar is only permitted to be moved by the spring $m$ a little distance in the direction indicated by the arrow in Fig. 4 fewer teeth of the four-leafed pinion will need to act upon the rack bar to move the latter far enough so that the shoulder $m^5$ striking $o^2$ will set the arm $i$ free. I make the distance to which the rack bar shall be thrown by the spring regulatable, as follows: Holes 2, 3, 4, 5, 6 and 0 are provided in the rack bar into which any form of pin may be inserted that will in effect be a stop to limit the movement of the rack, but I prefer to use a sliding block Q, and in it a spring pin thumb latch shown in section in Fig. 11. By seizing the knob $q$ the pin may be withdrawn from the hole and the sliding block Q adjusted to any desired position.

It but remains to show how the pawl $n'$ is removed from engagement with the teeth of the rack so that the said rack may be thrown to the position necessary for the beginning of the new count. $n^2$ is an upwardly projecting stop on the lever N. It rises high enough to strike the hub of I and there rest at times, as shown in Fig. 6. The effort of the spring $i^2$ being to throw the parts to which its ends are connected farther apart, this stop is thrown against the hub, as stated, in which position N and I may be considered as one piece. The spring K surrounds the hub of the lever J its free end secured, as stated, to the said lever J. This is for the purpose of causing its end $j$ to engage the arm $i$, its stress being such as to cause J to make a partial rotation in the direction indicated by the arrow No. 6 of Fig. 3. Understanding that the supporting block M' that guides the rack bar is pivotally supported in the arm $i$ it will be understood that as the spring $i^2$ forces the arm $i'$, when set free by the latch J, to turn upon its pivotal axis the parts will assume the position shown in Fig. 6 in which the rack bar is shown to be thrown to the right (at which is the lower end in the drawings) and that the abutment $m^5$ in that position will be out of reach of the operative end $o^2$ of the lever O and hence that there will be nothing to prevent the spring K from moving the lever J until its end will rest behind the arm $i$, and the latter, and the pawl N being at this interval practically as one piece, the operative end of the pawl will be thrown out of engagement with the latch teeth of the rack bar and the spring $m$ permitted to assert itself, when the bar will be thrown into its initial position and be in the proper position for the beginning of the new count. The rack bar is also supported by the guide R pivoted by the stem $r$ to an arm S which is free to move on the stationary pins. The purpose of thus linking the guide R to the main frame is two-fold, one so that in case the rake is turned backward in making any adjustments, as while putting the parts together, no harm will be done, and the other so that it affords automatic means for taking up lost motion due to wear. The pivot $s$ passes through a hub $s'$ which has a stop $s^2$, and upon the arm S is the stop $s^3$. These stops $s^2$ and $s^3$ are so placed that they shall be in contact with each other when the parts are in the position shown in Fig. 3. The stops practically prevent the rack bar from approaching too close to the four-leafed pinion. Around the hub $s^4$ of the arm S is wound the spring $s^5$, having one end fixed by passing into a notch $s^6$, and its free end extended and permitted to rest upon one member of the standard G', as seen in Fig. 3 where the latter is shown in section.

As explained, the automatic tripping of the switch is effected by the shoulder $m^5$ striking the operative end $o^2$ of the lever O and thus turning J so as to disengage the latching portion $j$ from the arm $i$. It is plain that if the shoulder $m^5$ could never reach $o^2$ no unlatching could take place. As I desire when turning a corner of the field to prevent any reel from operating as a rake and thus leaving the gavel in the way of the team in making the next round, I pivot the lever O to the lever J. I also pivot J' at $j^5$ to J and provide it with the pin $j^4$ adapted to move in the slot O', but as the slot is not concentric with the pivot $j^5$ a movement of the arm J' in the direction of arrow No. 7 of Fig. 3 by the operator pressing upward upon the pedal E through its connections F and F' will cause the lever to move to the position shown in Fig. 18 where its operative point $o^2$ is thrown so far away that the shoulder $m^5$ cannot strike it.

What I claim as my invention, and desire to secure by Letters Patent, is—

1. The combination of a series of reel-raking arms adapted to move upon a vertical axis, a cam surrounding said axis for controlling the reel-raking-arms, said cam provided with a switch which is closed by the raking-arms and opened at intervals by a spring, a tripping lever by which said cam switch is locked in its closed position and by the movement of which it is released when desired, a rack-bar provided with the tripping-shoulder $m^5$, which rack-bar is moved toward the tripping lever, a step at a time, said steps being contemporaneous with the passing of the rakes, until the tripping-shoulder $m^5$ engaging the tripping lever unlatches it from the said switch, a pinion adapted to give the said rack bar a longitudinal movement at intervals corresponding with the passing of the reel-rake-arms, a spring to force said rack-bar to its initial position, and a supporting mechanism for said bar actuated by said cam switch by which supporting mechanism the said rack-bar is moved sidewise and its teeth out of engagement with the teeth of said pinion and the said rack-bar is thus allowed to make a retrograde movement to its initial position after the operation of one of the said arms as a rake to sweep the platform, substantially as described.

2. The combination of a series of reel-raking-arms adapted to move upon a vertical axis, a cam surrounding said axis for controlling the reel-raking-arms, said cam provided with a switch which is closed by the raking-arms and opened at intervals by a spring, a tripping lever by which said cam switch is locked in its closed position and by the movement of which it is released when desired, a rack-bar provided with the tripping-shoulder $m^5$, which rack-bar is moved toward the tripping lever, a step at a time, said steps being contemporaneous with the passing of the rakes, until the tripping-shoulder $m^5$ engaging the tripping lever unlatches it from the said switch, a pinion adapted to give the said rack-bar a longitudinal movement at intervals corresponding with the passing of the reel-rake-arms a spring to force said rack-bar to its initial position, and a supporting mechanism for said bar actuated by said cam switch by which supporting mechanism the said rack-bar is moved sidewise and its teeth out of engagement with the teeth of said pinion and the said rack-bar is thus allowed to make a retrograde movement to its initial position after the operation of one of the said arms as a rake to sweep the platform, and an adjustable stop to determine the initial position of said bar, substantially as described.

3. The combination of a series of reel-raking-arms adapted to move upon a vertical axis, a cam surrounding said axis for controlling the reel-raking-arms, said cam provided with a switch that may at will be permitted to remain open, or be closed by the passage of the rake-arms, said switch consisting of an extension $g^5$ adjustably connected to the rake-controlling portion of the switch, whereby it can be placed in such position that the passage of a rake will force the switch closed or to permit the said switch to remain open, substantially as described.

4. In a reel-rake-cam a switch adapted to control the path of movement of the reel-rake-arms, a latch for holding it in its closed position and a spring for opening it when released, an adjustable extension $g^5$ adapted to be moved into the path of movement of the reel-raking-arms or out of said path at will, whereby, when moved out of said path, the passage of said arms will not close the switch, and when moved into the said path of movement the said arms will close the said switch, substantially as described.

5. A cam adapted to control the path of movement of the reel-raking-arms, said cam consisting of two parts $g$ and $g^5$ so connected together that the relative positions of its two parts may be adjusted so that the part $g^5$ may, at will, be made an instrumentality for closing the said cam, substantially as described.

6. In a reaper a cam adapted to control the path of movement of the raking arms, said cam consisting of two parts $g$ and $g^5$, the part $g^5$ pivoted concentrically to the axis of movement of the part $g$, and means for holding the said part $g^5$ into the desired relative position to $g$, substantially as described.

7. In a switch-controlling device for reapers the combination of the pinion $H^4$ having a number of teeth equal to the number of rakes, the rack M yieldingly supported and its teeth elastically held into position of mesh with the teeth of said pinion, said rack adapted to be moved in a longitudinal direction by the teeth of the said pinion as they successively engage the teeth of the said rack, a pawl for retaining the rack in each position to which it is moved by the teeth of said pinion, said pawl adapted to be disengaged from the ratchet teeth of said bar, a cam switch, a lock for holding it closed, the said bar M provided with a shoulder adapted to move the latch and set free the said clutch of said switch, and a spring adapted to open the said switch, all combined substantially as described.

8. In a switch-controlling device for reapers the combination of the pinion $H^4$ having a number of teeth equal to the number of rakes, the rack M yieldingly supported and its teeth elastically held into position of mesh with the teeth of said pinion, a spring to return said rack to its initial position, said rack adapted to be moved in a longitudinal direction by the teeth of the said pinion as they successively engage the teeth of the said rack, a pawl for retaining the rack in each position to which it is moved by the teeth of said pinion, said pawl adapted to be disengaged from the ratchet teeth of said bar, a cam switch, a lock for holding it closed, the said bar M provided with a shoulder adapted to move the latch and set free the said clutch of said switch, and a spring adapted to open the said switch, all combined substantially as described.

9. In a reel-rake, the rakes moving on a vertical axis and adapted to rise and fall, a switch adapted to control the movement of said rakes, the rack-bar M supported by and eccentrically connected to the axis of said switch in the guide M', a support R suspended from the pivoted arm S, a spring connecting said arm S to the guide R for elastically holding the said bar into such position that its teeth may be engaged by those of the pinion $H^4$, the said pinion $H^4$ secured to the main driving shaft, the spring-held pawl of arm $i$ on the switch-stem and the catch $j$, a spring connecting the said arm $i$ to the said pawl adapted to move them in reverse directions and thereby set free the said pawl and move the said rack away from the said pinion $H^4$, all combined substantially as described.

10. In a reaper, the combination with a reel-rake and the cam for controlling the same, a rotary part provided with teeth a part adapted to be engaged by said teeth and progressively moved as the rake-arms pass, and a pawl for holding the same into the positions to which it has progressed, a switch, the said switch having connected thereto a latch for setting the switch free so as to be moved open by its spring, a tripping lever adapted to operate said latch when struck by the said progressively moved part, and a lever pivoted to said latch and linked to said tripping lever so as to be adapted to be moved in one direction to set free the switch at will, and in the other direction to prevent the said progressively moved part from disengaging the said pawl and setting free the said switch, whereby under the control of the attendant the said rakes may be prevented from operating while turning the corner of a field of grain, substantially as described.

11. In combination with the switch latching arm $i$ and the latch J the lever J' pivoted to the latter and the arm O also pivoted thereto and adapted to be moved by said arm J' to such a position that the mechanism for setting free the said latch is rendered inoperative at will, substantially as described.

WILLIAM BUTTERFIELD.

Witnesses:
E. B. KENDALL,
ARTHUR JOHNSON.